United States Patent [19]

Pezzoli

[11] 4,171,405
[45] Oct. 16, 1979

[54] ASBESTOS TREATMENT WITH METAL MOLYBDATES

[75] Inventor: Paul A. Pezzoli, Midland, Mich.

[73] Assignee: The Dow Chemical Company, Midland, Mich.

[21] Appl. No.: 756,141

[22] Filed: Jan. 3, 1977

[51] Int. Cl.$^2$ .............................................. B32B 19/04
[52] U.S. Cl. ...................................... 428/443; 427/2; 427/215; 427/299; 427/343; 427/419 A; 428/271; 428/361; 428/378; 428/404
[58] Field of Search ............... 427/343, 215, 419, 299, 427/301, 2, 419 A; 428/443, 404, 389, 378, 379, 361, 271

[56] References Cited

U.S. PATENT DOCUMENTS

| | | | |
|---|---|---|---|
| 2,046,494 | 7/1936 | Van Rolleghem | 428/443 |
| 2,949,358 | 8/1960 | Alexander et al. | 428/404 |
| 2,972,529 | 2/1961 | Alexander et al. | 428/404 |
| 3,355,317 | 11/1967 | Keith et al. | 427/215 |
| 3,650,807 | 3/1972 | Witschard | 428/443 |

FOREIGN PATENT DOCUMENTS 167504  6/1959  Sweden ................................. 428/443

*Primary Examiner*—Ronald H. Smith
*Assistant Examiner*—Janyce A. Bell
*Attorney, Agent, or Firm*—James M. Kuszaj

[57] ABSTRACT

A method of treating asbestos comprising depositing on at least a portion of the asbestos a material consisting essentially of at least one metal molybdate.

41 Claims, No Drawings

ASBESTOS TREATMENT WITH METAL MOLYBDATES

BACKGROUND OF THE INVENTION

This invention relates to asbestos. More in particular, the present invention relates to a method of treating asbestos.

"Asbestos" is a general term applied to a group of naturally occurring fibrous silicate minerals that are commercially important because of their fibrous characteristics. Four principal types of asbestos minerals generally enter world commerce. These are chrysotile, crocidolite, amosite and anthophyllite. Of these, chrysotile is perhaps that most important, accounting for about 95 percent of the world's asbestos production.

Chemically, chrysotile asbestos is the fibrous form of the mineral serpentine, a hydrated magnesium silicate having the general formula $Mg_3Si_2O_3(OH)_4$. Structurally the chrysotile asbestos is believed to consist of rolled up sheets formed from two layers. The first layer is a continuous network of silica ($SiO_2$) tetrahedra. This layer is interlocked through common oxygen atoms with a second layer of magnesium hydroxide ($Mg(OH_2)$) octahedra. The walls of the asbestos fibers are composed of a number of such individual sheets contorted into scrolls with the magnesium hydroxide layer on the outside. Consequently, one of the dominant chemical features of chrysotile asbestos is its alkaline surface characteristics.

The surface modification of asbestine minerals, such as chrysotile, has attracted a good deal of attention from research workers during recent years. A large number of surface treatment methods have been proposed and evaluated for the purpose of modifying certain predetermined properties of the asbestos fibers. These procedures include: coating the surface of asbestos fibers with a phosphate, polyphosphate, or corresponding acid to improve the filtration characteristic of the fibers (U.S. Pat. Nos. 3,535,150, 3,957,571); treating asbestos fibers with magnesium carbonate or an oxide of a polyvalent metal to enhance the tensile strength of the fibers (U.S. Pat. Nos. 1,982,542; 2,451,805; 2,460,734); coating an asbestos fabric with an insoluble inorganic oxide to render the fabric flame resistant and water repellent (U.S. Pat. No. 2,406,779); mixing a detergent organic surface-active agent with fibrous asbestos agglomerates to disperse the asbestos fibers (U.S. Pat. No. 2,626,213); and distributing small amounts of polymeric particles or a water-soluble macromolecular organic substance throughout an asbestos product to reduce dust emitted by the asbestos during handling and use (U.S. Pat. Nos. 3,660,148; 3,967,043).

An area of concern to the producers and users of asbestine material has been the potential health problems allegedly associated with asbestos exposure. It has been reported by the National Safety Council that persons who inhale large amounts of asbestos dust can develop disabling or fatal pulmonary and pleural fibrosis (asbestosis) and several types of malignancy of the respiratory tract ("Asbestos", *National Safety Council Newsletter*, R & D Section, June 1974). There is also speculation that asbestos may cause various forms of carcinogenesis, particularly carcinoma of the lung, pleura and peritoneum (R. F. Holt, "Asbestosis", Nature, 253, 85 (1975)). Since the pathogenicity of asbestos minerals is apparently unmatched by any other silicate, there has been much interest in developing a method of passivating asbestos to reduce any potential fibrogenic and carcinogenic effects on those exposed to it without adequate precaution.

Existing methodology for studying the in vivo fibrogenic effects of asbestos involves direct inhalation or intratracheal administration of asbestos fibers to animals. Subsequently, the experimentally treated animals are examined, usually months later, for pathological and histochemical evidence of fibrosis. Since the incubation period for asbestos-induced diseases is reported to be unusually long, experiments of this type are complicated, expensive and time consuming.

However, recent work done by R. R. Hefner, Jr. and P. J. Gehring (*American Industrial Hygiene Association Journal*, 36, 734–740 (1975)) shows that a relationship exists between the in vivo fibrogenicity of asbestos and its in vitro hemolytic activity. Hemolytic activity, or hemolysis, is a measure of induced blood cell rupture when fibers are agitated with a suspension of blood erythrocytes. Numerous other authors have also made similar in vitro evaluations of a number of particulates.

The in vitro hemolytic model provides a rapid, relatively inexpensive test which reliably assesses the fibrogenic potential of asbestos. Consequently, the hemolytic model has been employed in the present invention to test the effectiveness of certain asbestos treating procedures found to be potentially useful in alleviating some of the health problems reportedly associated with asbestos fibers.

Various materials have been examined which interact with the surface of asbestos fibers and reduce its hemolytic activity. Such material includes disodium ethylenediamine tetraacetic acid (EDTA), simple phosphates, disodium versenate, polyvinylpyridine N-oxide and aluminum (G. Macnab and J. S. Harington, Nature 214, 522-3 (1967), and certain acidic polymers (R. J. Schnitzer and F. L. Pundsack, Environmental Research 3, 1–14 (1970). In addition, West German Pat. No. 1,642,022 discloses that asbestos coated with polyvinylpyridine N-oxide minimizes the risk of asbestosis.

Some of these known materials, such as EDTA, are solubilized in body fluids and do not reduce the long term hemolytic activity of the asbestos. There is therefore a need to determine materials which will adhere to the asbestos and reduce its hemolytic activity. Such passivating materials should not adversely affect the useful commercial properties of the asbestos.

SUMMARY OF THE INVENTION

The present invention is a method for treating asbestos comprising depositing on at least a portion of the asbestos a material consisting essentially of at least one metal molybdate.

Using a hemolysis test described herein, as an in vitro screening test to assess the effectiveness of the metal molybdate treatment, it has been surprisingly found that asbestos fibers with at least one metal molybdate deposited thereon have reduced hemolytic activity in comparison with untreated asbestos fibers.

DESCRIPTION OF THE PREFERRED EMBODIMENT

In accordance with the present invention, asbestos is treated to deposit at least one metal molybdate on at least a portion of the asbestos.

A number of suitable deposition techniques can be employed to treat the asbestos. For example, the asbestos can initially be contacted with a solution of an ionizable salt of at least one first metal to deposit at least a portion of the ionizable salt on the asbestos. The ionizable salt-treated asbestos is subsequently contacted with a solution of a molybdate salt of at least one second metal to form a molybdate of at least one first metal on at least a portion of the surface of the asbestos.

Alternatively, the asbestos can initially be contacted with a solution of molybdate salt of at least one second metal to deposit at least a portion of the molybdate salt of the second metal on the asbestos. If it is desirable to have another metal molybdate, in addition to, or other than, the second metal molybdate deposited on the asbestos, the molybdate salt-treated asbestos can optionally be contacted with a solution of an ionizable salt of at least one first metal, to form a molybdate of at least one first metal on at least a portion of the asbestos.

In another embodiment, the metal molybdates can be deposited on the asbestos by directly contacting the surface of the asbestos with a suspension of at least one first metal molybdate in a liquid medium, such as water. One suitable technique involved suspending a particulate first metal molybdate in water, spraying the suspension onto the surface of the asbestos, and removing the water by drying. First metal molybdates which can be suitably applied in this manner include those that are insoluble in the suspending medium.

For the purpose of this specification, the following definitions are adopted. The first series of transition metals begins with element number 21, scandium, and continues through element number 29, copper. The second series of transition metal begins with yttrium, number 39, and ends with silver 47. The group II B metals are zinc, cadmium, and mercury. The group III metals are aluminum, gallium, indium, and thallium. The group IV metals are germanium, tin, and lead. The oxidation state (valence) of metals which commonly exhibit more than one valence is indicated by a Roman numeral in parentheses following the metal to which it refers. The terms ionizable salt and molybdate salt refer to both the anhydrous and hydrated forms of the salts.

The methods of treating the asbestos include depositing an ionizable salt of at least one suitable first metal on at least a portion of the asbestos. In this context an ionizable salt is defined as a salt which dissociates spontaneously into cations and anions when dissolved in a suitable polar solvent, such as water, formamide, acetamide, ethanol, 1-propanol, dimetyl sulfoxide, methanol, mixtures thereof, and the like. The preferred solvent is water.

Any metal cation which is capable of forming a molybdate salt can be used as a first metal. Preferably, the first metal cation is selected from the alkali metals, alkaline earth metals, first series transition metals, second series transition metals, group II B metals, group III metals, and group IV metals.

More preferably, the alkali metal is sodium; the alkaline earth metal is selected from the group consisting of magnesium, calcium, and barium; the first series transition metal is selected from the group consisting of titanium (III), titanium (IV), chromium, manganese, iron (II), iron (III), cobalt, and nickel; the second series transition metal is selected from the group consisting of zirconium and silver; the group III metal is aluminum; the group IV metal is selected from the group consisting of tin (II), tin (IV), and lead; and the group II B metal is selected from the group consisting of zinc and cadmium. Most preferably, the first metal cation is tin (II), tin (IV), or a mixture thereof.

Suitable second metal cations are those which form soluble molybdate salts, preferably, water soluble molybdate salts. The preferred second metal cations are the alkali metals, and more preferably, sodium, potassium, or a mixture thereof.

Any ionizable salt which will ionize in solution to produce a cation of at least one of the above first metal cations can be used in the present process. However, the preferred ionizable salt is a chloride, sulfate, nitrate, or a mixture thereof of at least one of the first metals. More preferably, the ionizable salt is a water soluble chloride salt of at least one of the first metals. Furthermore, the ionizable salt can contain more than one type of cation and one type of anion. For example, a mixture of chloride salts of two first metals, or a mixture of the chloride and sulfate salts of the same first metal is suitable.

The concentration of the solution of the ionizable salt employed in the present process is sufficient to form a deposit of the ionizable salt on the asbestos. Preferably, the concentration of the solution of the ionizable salt is from about 1 percent by weight of the salt to about the concentration corresponding to a saturated solution of the particular first metal salt. For example, when nickel chloride hexahydrate is the ionizable salt, the concentration of the salt in an aqueous salt solution at 20° C. and 1 atmosphere pressure is from about 1 to about 72 percent by weight. More preferably, the concentration of the solution of the ionizable salt is from about 5 to about 10 percent by weight of the salt.

A number of suitable techniques are known for initially applying the ionizable salt solution compounds to the asbestos. These techniques include spraying the ionizable salt solution onto the asbestos or soaking the asbestos in the ionizable salt solution. The preferred method of contacting the asbestos with the ionizable salt solution is by slurrying the asbestos in the ionizable salt solution for a sufficient time to allow the surface of the asbestos to be contacted and wetted by the solution.

Advantageously, the mixture of asbestos and the ionizable salt solution can then be agitated at room temperature for a sufficient time to allow the ionizable salt solution to contact at least a portion, and preferably substantially all of the asbestos surfaces. The agitation of the mixture is accomplished by use of agitation means well-known in the art. These include mechanical, air, hydraulic or magnetic means for inducing agitation.

Following agitation, the asbestos suspended in the ionizable salt solution can be separated from the filtrate (ionizable salt solution) by any suitable solid-liquid separation technique such as vacuum filtration. The ionizable salt-treated asbestos can then be contacted with a solution, preferably an aqueous solution, of a molybdate salt of at least one of the second metals. The techniques for applying the ionizable salt solution discussed above can be used to contact the ionizable salt-treated asbestos with the molybdate salt solution. However, it is preferred to slurry the ionizable salt-treated asbestos with the molybdate salt solution. The ionizable salt-treated asbestos is maintained in contact with the molybdate salt solution for a sufficient time to allow at least a portion, and preferably substantially all the molybdate salt solution to contact the ionizable salt-treated asbestos and react with the ionizable salt thereon to form a metal molybdate compound wherein the cation of said compound is originally the cation of the first metal associated with the ionizable salt.

The molybdate salt solution has a concentration sufficient to form a deposit of the molybdate salt on the asbestos. Preferably, the concentration of the molybdate salt solution is from about 1 percent by weight to about the concentration corresponding to a saturated solution of the molybdate of the second metal. For example, when sodium molybdate ($Na_2MoO_4.2H_2O$) is employed, the concentration of the salt in an aqueous solution at 20° C., 1 atmosphere pressure, is from about 1 to about 36 percent by weight of the sodium molybdate. Preferably, the molybdate salt solution has a concentration of from about 1 to about 10 percent by weight of the second metal molybdate.

The asbestos-molybdate salt solution slurry is preferably agitated at about room temperature for a sufficient time to insure contact between the asbestos and the molybdate salt solution.

Following agitation, the asbestos is separated from the filtrate by any suitable solid-liquid separation technique, such as vacuum filtration. Preferably the filtered asbestos is subsequently washed with a suitable solvent, such as deionized water, to remove any non-adherent molybdate compound. The asbestos can then be dried by any suitable techniques, such as air drying, heating, vacuum and the like.

The asbestos treated by the present method is characterized as being a fibrous asbestos material consisting essentially of asbestos fibers with a coating of at least one first or second metal molybdate deposited on at least a portion of the asbestos fibers. Preferably, the asbestos material consists of asbestos fibers coated with substantially only a metal molybdate. Any metal cation capable of forming a molybdate salt on the asbestos can be used. Examples of preferred first and second metals have been described above.

The asbestos treated by the present invention can include chrysotile, crocidolite, amosite, or anthophyllite asbestos. Chrysotile, being the most abundant type of asbestos, is the preferred material for treatment by the present process. The physical form of asbestos treated includes fibrous mineral bundles of fine crystalline fibers, or individual fibers. Preferably the asbestos is in the form of bundles of crystalline fibers. Generally, the individual fibers of the bundle have a fiber length of at least about 0.5 micron, and a diameter of at least about 0.01 micron. However, other fiber lengths and diameters can be employed.

The exact mechanism by which the deposited metal molybdate forms an adherent coating on the asbestos is not completely understood. It is believed that the coating is due to the alkaline outer surface of the asbestos fiber. The individual fibers are composed of a network of magnesium hydroxide tetrahedra. The outermost portion of the tetrahedra contains hydroxyl groups. There is some evidence that hydroxyl hydrogens are being displaced by the metal cation, to form a bond between the metal molybdate and the asbestos. Since each asbestos fiber is composed of a number of individual sheets having outer hydroxyl groups, and because these sheets are contorted into concentric scrolls, the deposition of the metal molybdate may occur on more than just the outermost exposed surface of the asbestos fiber. Some of the metal molybdate may impregnate the interior scrolls of the fiber and deposit on the interior hydroxyl surface present.

Any amount of metal molybdate is beneficial to reduce hemolysis. However, the metal molybdate that is deposited on the asbestos is preferably present in an amount of from about 0.05 to about 5.0 percent by weight based on the weight of the asbestos. The metal molybdate deposited on the exposed asbestos surface is from about 0.5 to about 250 angstroms thick. Preferably, the molybdate surface coating is from about 2 to about 50 angstroms thick. As recognized by those skilled in the art, the thickness of the surface coating can vary depending on the nature of the asbestos, its intended end use, and economics.

The following examples further illustrate the present process.

EXAMPLES

A regular grade of Carey 7RF-9 Canadian chrysotile asbestos was used in all of the following examples. The asbestos had a mean fiber length of about 30 microns, and contained about 10–15 percent by weight of impurities. The impurities present were characterized by X-ray diffraction and were found to be about 5 percent by weight $Fe_3O_4$, about 5–10 percent by weight $Mg(OH)_2$ and fractional weight percents (less than 1 percent by weight) of each of minor impurities generally associated with commercially pure chrysotile asbestos, such as aluminum, chromium, cobalt, scandium and the like.

EXAMPLE 1

Fifteen grams (g) of the asbestos were placed in a 500 milliliters (ml) flask at 20° C. and 1 atmosphere pressure. To this was added 300 ml of an aqueous $SnCl_2.2H_2O$ solution containing 10 percent by weight $SnCl_2.2H_2O$.

The resultant slurry was agitated by use of a magnetic stirring bar to insure uniform dispersion of the $SnCl_2.2H_2O$ throughout the asbestos fibers. Agitation of the slurry in this manner was maintained for 60 minutes at room temperature. The slurry was then filtered by vacuum filtration using Whatman #1 filter paper and a porcelain Buchner funnel.

While still moist, the asbestos fibers were reslurried with 100 ml of an aqueous solution containing 10 percent by weight $Na_2MoO_4.2H_2O$ together with 500 ml of deionized water in an 800 ml beaker. The resultant slurry was agitated by magnetic stirring for 15 minutes. The slurry was filtered by vacuum filtration using a Whatman #1 filter paper and a porcelain Buchner funnel. The filtered asbestos fibers were washed with 500 ml of deionized water to remove any undeposited salts and allowed to air dry at room temperature for from 12 to 15 hours.

The chrysotile surface coating was characterized by X-ray diffraction and atomic absorption spectroscopy. A coating of tin (II) molybdate was shown to be distributed along the surface of the asbestos fibers. Both electron emission spectroscopy and atomic absorption spectroscopy were used to determine the amount of molybdate coating on the fibers. The results verified microscopy data in that about 2 angstroms of the tin (II) molybdate were coated on the fibers. High magnification transmission electron microscopy indicated no significant morphological differences between uncoated and coated fibers.

Since chrysotile asbestos is widely used for high temperature insulation, the thermal stability of the coated asbestos was investigated. The differential thermal analysis of coated and uncoated asbestos indicated that there was no appreciable difference in thermal stability due to the coating.

Hemolysis tests of the coated asbestos fibers were conducted in the following manner: Whole rat blood was suspended in 200-300 ml of ISOTON®, an isotonic blood cell diluent, without an anticoagulant. The whole blood suspension was centrifuged and the red cells were collected and washed in 200-300 ml volume of the pure isotonic diluent. The washing removed plasma which is known to inhibit blood hemolysis from the whole blood suspension. After subsequent centrifugation of the washed cell suspension, a final blood suspension was prepared. This suspension was a 2 percent, by volume, concentration of centrifuged red blood cells in the isotonic diluent.

About 250 milligrams (mg) asbestos fibers were placed in tissue culture flasks and a 25 ml volume of the 2 percent blood suspension was added to each flask. The resultant mixture was agitated by mechanical means and placed in a constant temperature (98.6±0.5° F.) water bath. The flasks were incubated for 30 minutes in a mechanical shaking incubator at a slow, constant rate of 50 cycles per minute. Control blood suspensions were incubated using the same procedure. Spontaneous hemolysis was determined by incubating the 2 percent blood sususpension a small amount (less than one mg) of saponin powder (a known hemolytic agent).

The culture flasks were removed from the incubator after 30 minutes and the contents of each flask were centrifuged. A 3 ml volume of the resultant supernatant liquid was withdrawn and diluted with deionized water to a volume of 100 ml. The absorbance of the diluted samples was measured at 415 nanometer (nm) using a double-beam spectrophotometer. The diluted spontaneous hemolysis liquid was used as the reference solution in all absorbance measurements. Percent hemolysis was defined as $$\% \text{ Hemolysis} = \frac{A_H}{A_{100}} \times \frac{100}{100}$$

where $A_H$ was the absorbance of a sample with asbestos fibers and $A_{100}$ was the absorbance of the 100% hemolyzed sample.

The dramatic reduction of hemolytic activity induced by the deposited tin (II) molybdate is shown in Table I.

EXAMPLE 2

Twenty grams (g) of asbestos fibers were placed in an 800 ml beaker at 20° C. and 1 atmosphere pressure. To this was added 400 ml of an $Na_2MoO_4 \cdot 2H_2O$ solution containing 10 percent by weight $Na_2MoO_4 \cdot 2H_2O$.

The resultant slurry was agitated by use of a magnetic stirring bar to insure uniform dispersion of the $Na_2WO_4 \cdot 2H_2O$ throughout the asbestos fibers. Agitation of the slurry in this manner was maintained for about 60 minutes at room temperature. The slurry was then filtered by vacuum filtration using Whatman #1 filter paper and a porcelain Buchner funnel.

While still moist, the asbestos fibers were reslurried with 100 ml of an aqueous solution containing 10 percent by weight $SnCl_4 \cdot 5H_2O$, together with 500 ml of deionized water in an 800 ml beaker. The resultant slurry was further treated and tested for hemolysis as described in Example 1.

EXAMPLES 3-20

Examples 3-20 were prepared in substantially the same manner as described in Example 1, except that salts of different metals were used in the initial contacting step. The reduction of hemolytic activity induced by the deposited metal moybdates is shown in Table I.

COMPARATIVE EXAMPLE A

Uncoated chrysotile asbestos was tested for hemolytic activity by the method described in Example 1. The results are shown in Table I.

Table I

| Hemolysis Induced by Molybdate Coating on Chrysotile Asbestos | | |
|---|---|---|
| Example | Coating | % Hemolysis |
| 1 | $SnMoO_4$ | 2 |
| 2 | $FeMoO_4$ | 4 |
| 3 | $Sn(MoO_4)_2$ | 8 |
| 4 | $Ag_2MoO_4$ | 15 |
| 5 | $BaMoO_4$ | 17 |
| 6 | $Fe_2(MoO_4)_3$ | 18 |
| 7 | $CaMoO_4$ | 22 |
| 8 | $Cr_2(MoO_4)_3$ | 22 |
| 9 | $PbMoO_4$ | 23 |
| 10 | $CdMoO_4$ | 29 |
| 11 | $CoMoO_4$ | 32 |
| 12 | $MnMoO_4$ | 33 |
| 13 | $Zr(MoO_4)_2$ | 33 |
| 14 | $MgMoO_4$ | 45 |
| 15 | $ZnMoO_4$ | 52 |
| 16 | $Al_2(MoO_4)_3$ | 55 |
| 17 | $Na_2MoO_4$ | 57 |
| 18 | $Ti(MoO_4)_2$ | 59 |
| 19 | $Ti_2(MoO_4)_3$ | 59 |
| 20 | $NiMoO_4$ | 65 |
| A (Comparative) | None | 70 |

The durability of the coatings of Examples 1, 2, 3, 4, and A was determined by a series of attrition tests. The first-stage tests consisted of washing the coated asbestos fibers sequentially with (1) water, (2) an aqueous solution of 0.1 normal (N) HCl, (3) an aqueous solution of 0.1 N NaOH, and (4) acetone. Treated fibers were also tested for durability by heat treatment for 3 hours at 150° C. and by grinding in a mechanical blender. After each of the six tests, the coated fibers were reevaluated using the hemolysis test. The results of first-stage attrition test are outlined in Table II. The durability of a coating in a test was indicated by the difference in the hemolysis value before and after attrition. An increase in the percent hemolysis, indicated that the coating was being removed by that test.

When the uncoated chrysotile was heated to 150° C. for three hours the hemolytic activity of the fibers was reduced from 70 percent to 12 percent as shown in Table II. The reduction in hemolytic activity of the uncoated asbestos as a function of temperature and time was studied. The results indicated that no passivation of the fibers occurred through heat treatment; instead, reversible dehydration of the fibers was observed.

TABLE II

First-Stage Attrition Tests with Coated Chrysotile Asbestos

| | | % Hemolysis | | | | | | |
|---|---|---|---|---|---|---|---|---|
| Example | Coating | Initial | $H_2O$ Wash | 0.1 N HCl Wash | 0.1 N NaOH Wash | Acetone Wash | Heated to 150° C./3 Hr | Ground |
| 1 | $SnMoO_4$ | 2 | 2 | 2 | 5 | 1 | 0 | 1 |
| 2 | $FeMoO_4$ | 4 | 0 | 3 | 41 | 9 | 3 | 4 |
| 3 | $Sn(MoO_4)_2$ | 8 | 4 | 4 | 4 | 1 | 2 | 3 |
| 4 | $Ag_2MoO_4$ | 15 | 23 | 15 | 26 | 25 | 21 | 13 |
| A | None | 70 | 77 | 40 | 75 | 78 | 12 | 78 |

Coatings which continued to show low hemolytic activity after subjection to first-stage attrition test were tested in second-stage attrition tests. These tests included slurrying the coated fibers in deionized water for a period of up to 3 months and continuously washing the fibers with water for up to 1 month. The hemolytic activity of the fibers was measured periodically and the results are shown in Table III.

TABLE III

Second-Stage Attrition Test with Coated Chrysotile Asbestos

| Ex. | Coating | Attrition Test | Time weeks | % Hemolysis |
|---|---|---|---|---|
| 1 | $SnMoO_4$ | Continuous Water Wash (95° C.) | 0 | 2 |
| | | | 2 | 3 |
| | | | 4 | 40 |
| | | Water Slurry (25° C.) | 0 | 2 |
| | | | 4 | 0 |
| | | | 8 | 3 |
| | | | 12 | 3 |
| 2 | $Sn(MoO_4)_2$ | Continuous Water Wash (95° C.) | 0 | 8 |
| | | | 2 | 12 |
| | | | 4 | 16 |
| | | Water Slurry (25° C.) | 0 | 8 |
| | | | 4 | 7 |
| | | | 8 | 9 |
| | | | 12 | 4 |

The results presented in Tables I–III clearly indicate the significant reduction in hemolysis achieved by the present process. Untreated asbestos ruptured about 70% of the available red cells in a blood suspension while the various molybdate coated fibers induced from 2 to 65% hemolysis. Furthermore, the coatings on the chrysotile asbestos have been demonstrated to be extremely durable when subject to a rigorous series of chemical and physical tests.

What is claimed is:

1. A method of treating asbestos to reduce its hemolytic activity comprising depositing on at least a portion of the asbestos a material consisting essentially of at least one hemolysis-reducing metal molybdate in an amount of 0.5 to 5.0 percent by weight, based on the weight of the asbestos.

2. The method of claim 1 wherein the metal is selected from the group consisting of alkali metals, alkaline earth metals, first series transition metals, second series transition metals, group II B metals, group III metals, and group IV metals.

3. The method of claim 2 wherein the alkali metal is sodium.

4. The method of claim 2 wherein the alkaline earth metal is selected from the group consisting of magnesium, calcium, and barium.

5. The method of claim 2 wherein the first series transition metal is selected from the group consisting of titanium (III), titanium (IV), chromium, manganese, iron (II), iron (III), cobalt, and nickel.

6. The method of claim 2 wherein the second series transition metal is selected from the group consisting of zirconium and silver.

7. The method of claim 2 wherein the group III metal is aluminum.

8. The method of claim 2 wherein the group IV metal is selected from the group consisting of tin (II), tin (IV), and lead.

9. The method of claim 2 wherein the group II B metal is selected from the group consisting of zinc and cadmium.

10. A method of treating asbestos to reduce its hemolytic activity comprising:
    (a) contacting the asbestos with a solution of an ionizable salt of at least one first metal to deposit at least a portion of the ionizable salt on the asbestos;
    (b) contacting the asbestos with a solution of a molybdate salt of at least one second metal to form a molybdate of at least one first metal on at least a portion of the surface of the asbestos.

11. A method of treating asbestos to reduce its hemolytic activity comprising depositing on at least a portion of the asbestos a material consisting essentially at a hemolysis-reducing tin (II) molybdate.

12. A method of treating asbestos to reduce its hemolytic activity comprising depositing on at least a portion of the asbestos a material consisting essentially of a hemolysis-reducing tin (IV) molybdate.

13. The method of claim 10 wherein the second metal is an alkali metal.

14. The method of claim 13 wherein the alkali metal is selected from the group consisting of sodium and potassium.

15. The method of claim 10 wherein the first metal is selected from the group consisting of alkali metals, alkaline earth metals, first series transition metals, second series transition metals, group II B metals, group III metals, and group IV metals.

16. The method of claim 10 wherein the solution of the ionizable salt has a salt concentration of from about 1 percent by weight to about a concentration corresponding to saturated solution of the salt.

17. The method of claim 10 wherein the solution of the ionizable salt has a salt concentration of from about 5 percent by weight to about 10 percent by weight of the salt.

18. The method of claim 10 wherein the ionizable salt includes at least one member selected from the group consisting of a chloride, a sulfate, and a nitrate.

19. The method of claim 10 wherein the ionizable salt is a chloride.

20. The method of claim 10 wherein the solution of the molybdate salt has a concentration of from about 1 percent by weight to about the concentration corresponding to a saturated solution of the molybdate of the second metal.

21. The method of claim 10 wherein the solution of the molybdate salt has a concentration of from about 1 percent by weight to about 10 percent by weight of the molybdate of the second metal.

22. The method of claim 10 wherein the solution of the ionizable salt is an aqueous solution.

23. The method of claim 10 wherein the solution of the molybdate salt is an aqueous solution.

24. The method of claim 1 wherein the depositing step comprises spraying at least a portion of the asbestos with at least one metal molybdate suspended in a liquid medium.

25. The method of claim 24 wherein the medium is water.

26. The method of claim 1 wherein the depositing step comprises:
 (a) contacting the asbestos with a solution of a molybdate salt of at least one second metal to deposit at least a portion of the molybdate salt on the asbestos; and optionally
 (b) contacting the asbestos from step (a) with a solution of an ionizable salt of at least one first metal to form a molybdate of at least one first metal on at least a portion of the surface of the asbestos.

27. A method for treating asbestos comprising:
 (a) slurrying the asbestos with a sufficient amount of an aqueous solution of an ionizable salt of at least one first metal selected from the group consisting of alkali metals, alkaline earth metals, first series transition metals, second series transition metals, group II B metals, group III metals, and group IV metals, to deposit at least a portion of the ionizable salt of at least one first metal on at least a portion of the asbestos;
 (b) slurrying the asbestos from step (a) with an aqueous solution of a molybdate salt of at least one alkali metal to form about 0.05 to 5.0 percent by weight, based on the asbestos a molybdate salt of at least one first metal on at least that portion of the asbestos wherein the ionizable salt of the first metal was deposited.

28. The method of claim 27 including agitating the asbestos and the aqueous solution of the ionizable salt of the first metal for a sufficient time to allow the ionizable salt to contact at least a portion of the asbestos.

29. A fibrous asbestos material consisting essentially of asbestos fibers having deposited thereon at least one hemolysis-reducing metal molybdate about 0.05 to 5.0 percent by weight, based on the asbestos.

30. The material of claim 29 wherein the metal is selected from the group consisting of alkali metals, alkaline earth metals, first series transition metals, second series transition metals, group II B metals, group III metals, and group IV metals.

31. The material of claim 30 wherein the alkali metal is sodium.

32. The material of claim 30 wherein the alkaline earth metal is selected from the group consisting of magnesium, calcium, and barium.

33. The material of claim 30 wherein the first series transition metal is selected from the group consisting of titanium (III), titanium (IV), chromium, manganese, iron (II), iron (III) cobalt, and nickel.

34. The material of claim 30 wherein the second series transition metal is selected from the group consisting of zirconium and silver.

35. The material of claim 30 wherein the group III metal is aluminum.

36. The material of claim 30 wherein the group IV metal is selected from the group consisting of tin (II), tin (IV), and lead.

37. The material of claim 30 wherein the group II B metal is selected from the group consisting of zinc and cadmium.

38. A fibrous asbestos material consisting essentially of asbestos fibers having deposited thereon hemolysis reducing tin (IV) molybdate.

39. A fibrous asbestos material consisting essentially of asbestos fibers having deposited thereon a hemolysis reducing tin (II) molybdate.

40. A method of treating asbestos to reduce its hemolytic activity comprising depositing on at least a portion of the asbestos an effective amount of a material consisting essentially of at least one metal molybdate selected from the group consisting of tin (II) molybdate, tin (IV) molybdate, iron (II) molybdate, and silver molybdate, to reduce the hemolytic activity of the asbestos to at least about 15 percent hemolysis.

41. A fibrous asbestos material consisting essentially of asbestos fibers having deposited thereon at least one metal molybdate selected from the group consisting of tin (II) molybdate, tin (IV) molybdate, iron (II) molybdate, and silver molybdate, said fibrous asbestos material being further characterized as having its hemolytic activity reduced by said deposited metal molybdate to at least about 15 percent hemolysis.

* * * * *

UNITED STATES PATENT AND TRADEMARK OFFICE
CERTIFICATE OF CORRECTION

PATENT NO. : 4,171,405
DATED : October 16, 1979
INVENTOR(S) : Paul A. Pezzoli

It is certified that error appears in the above-identified patent and that said Letters Patent are hereby corrected as shown below:

Col. 1, line 15, delete "that" and insert --the--.

Col. 2, line 59, delete "posted" and insert --posited--.

Col. 3, line 40, delete "perentheses" and insert --parentheses--.

Col. 3, line 49, delete "dimetyl" and insert --dimethyl--.

Col. 8, line 10, delete "moybdates" and insert --molybdates--.

Col. 9 & 10, in the first line of Table II, under the "Example" column, insert --1--.

Col. 9, Table III, line 37, under "Time Weeks" delete "12 4" and insert --12-- and under "% Hemolysis" insert --4--.

Col. 10, Claim 16, line 54, insert --a-- in front of saturated.

Signed and Sealed this

Twenty-second Day of January 1980

[SEAL]

Attest:

SIDNEY A. DIAMOND

Attesting Officer

Commissioner of Patents and Trademarks